United States Patent [19]

Spitalnik

[11] 3,824,489

[45] July 16, 1974

[54] MICROWAVE OSCILLATOR

[75] Inventor: Robert Spitalnik, Cachan, France

[73] Assignee: U.S. Philips Corporation, New York, N.Y.

[22] Filed: Apr. 25, 1973

[21] Appl. No.: 354,660

[30] Foreign Application Priority Data

Apr. 25, 1972 France ............................ 72.14550

[52] U.S. Cl. ............ 331/107 R, 331/96, 331/107 T

[51] Int. Cl. ............................................ H03b 7/08

[58] Field of Search ...... 331/96, 101, 107 R, 107 G, 331/107 T

[56] References Cited

UNITED STATES PATENTS

| | | | |
|---|---|---|---|
| 3,639,856 | 2/1972 | Kimura et al. | 331/96 |
| 3,691,479 | 9/1972 | Malcolm | 331/96 |

*Primary Examiner*—John Kominski

*Attorney, Agent, or Firm*—Frank R. Trifari

[57] ABSTRACT

A microwave oscillator which is intended for a semiconductor element and which is accommodated in a ridge-type waveguide. The waveguide is formed on the one side by a portion of small height which is closed by a short-circuit element, and on the other side by a portion having a progressively increasing height which is provided with a resonant structure. The resonant structure is formed by a thin vertical pin and by two further pins which are arranged perpendicular to the side walls of the wave guide and which can be axially adjusted. The assembly formed by these three components constitutes a transmission line which enables transmission of a microwave according to the T.E.M.-mode.

8 Claims, 5 Drawing Figures

MICROWAVE OSCILLATOR

Figure 1:
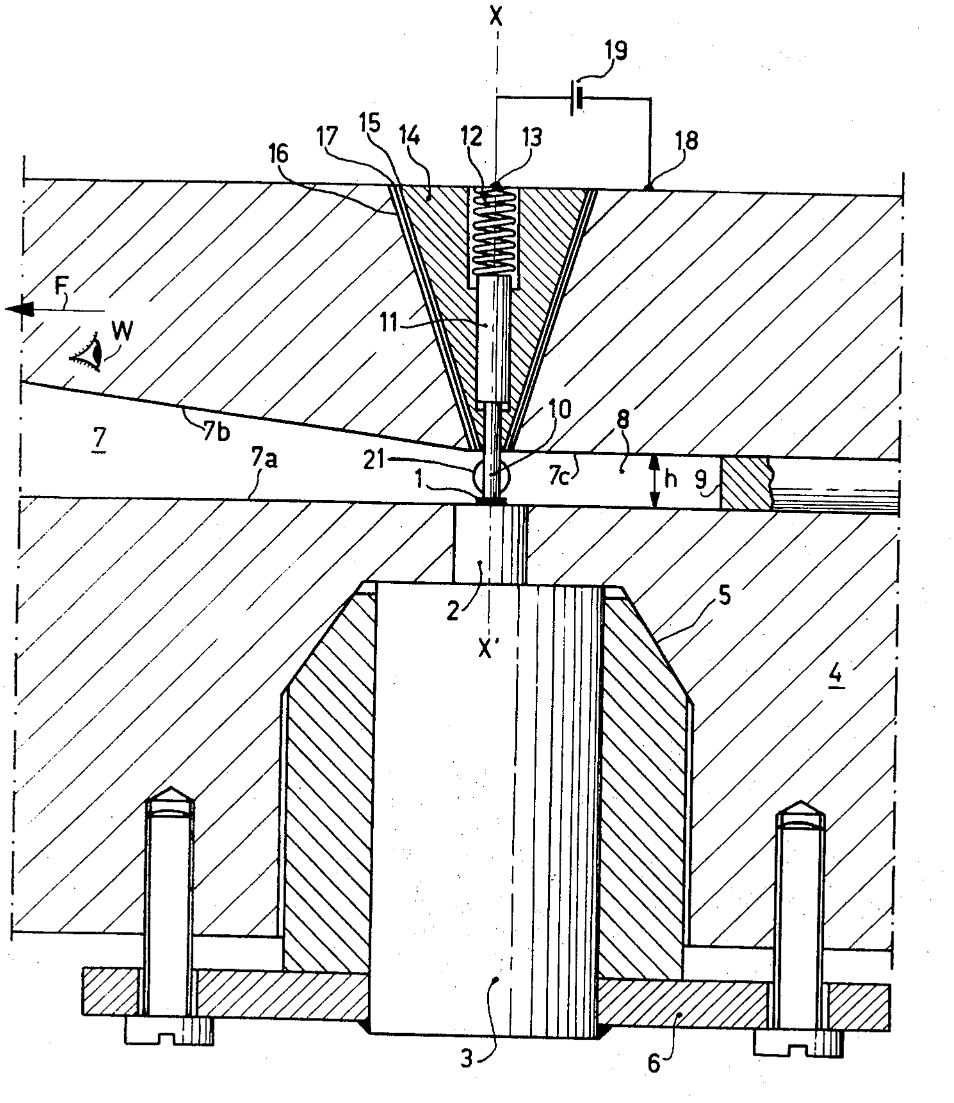

The invention relates to a microwave device, comprising a rectangular waveguide which is provided with a ridge, half-way the transverse dimension, which extends in the longitudinal direction, perpendicular to the upper wall, which is galvanically connected thereto and which has good electrical conductivity, and a semiconductor element having a dynamic resistance which is negative for the microwave range, one side of the said element being galvanically connected to the lower wall of the waveguide, the other side being coupled to a connection terminal which is provided with a short-circuit which is active for microwave frequencies, the said short-circuit being connected between the connection terminal and the upper wall of the waveguide in order to enable the application of a direct voltage which polarizes the semiconductor element between the waveguide and the connection terminal.

French Pat. Specification No. 2,008,414 describes a microwave oscillator which has a coaxial construction. Neither the resonant frequency nor the impedance level of this coaxial oscillator can be adjusted; when this oscillator is used for operating frequencies which are higher than those stated in the said Patent Specification, undesired modes can be readily generated, and the load will be included in the supply circuit of the semiconductor element.

The invention has for its object to realize a microwave oscillator in the form of a rectangular waveguide, the said oscillator not only being suitable for the normal microwave frequencies but also for use at frequencies between 26 and 100 GHz, the impedance matching of the semiconductor element and the resonant frequency being readily adjustable.

To this end, the device according to the invention is characterized in that it is provided with a structure which determines the resonant frequency and the impedance matching, the said structure comprising a very this pin which is arranged between the connection terminal and the semiconductor element, perpendicular to the lower surface of the waveguide, and also comprising two further pins which are situated in a plane which extends through the said thin pin, perpendicular to the longitudinal direction of the waveguide, the said two further pins being symmetrical with respect to the said thin pin and being arranged at right angles on the side walls of the waveguide.

In accordance with another characteristic, the said further pins are adjustable in the axial direction.

According to another characteristic yet, the ridge-type waveguide is formed by a waveguide, a first longitudinal portion of which, situated on one side of the semiconductor element and comprising a short-circuit element whose position can be controlled, has a very small height, and a second longitudinal portion of which, situated on the other side of semiconductor element, has a progressively increasing height.

The two portions of the ridge-type waveguide are such that the rectangular ridge of the upper surface has a constant cross-section as regards the waveguide portion of very small height, but a progressively decreasing cross-section as regards the second portion. The waveguide of the microwave oscillator according to the invention thus has a very small height as far as the plane of the semiconductor element, whilst beyond this plane the height of the waveguide progressively increases until the normal cross-sectional height of a rectangular waveguide is reached.

It is a first advantage of the invention that, due to the fact that the polarization current does not flow through the load, the energy loss which would otherwise occur is avoided.

A second advantage of the invention is that the thin pin constitutes the central conductor of a T.E.M.-line, the side walls of which are formed by the end faces of the two further pins, with the result that simple impedance matching is achieved. By displacement of the two further pins towards or away from the central conductor of the T.E.M.-line, the resonant structure of the circuit can be accurately controlled, and the characteristic impedance of the line can be changed.

It is a third advantage of the invention that notably the height of the (thin pin) central conductor of the T.E.M.-line determines the oscillation frequency, this frequency also being dependent of the relationship between the impedance of the T.E.M.-line and the resistance of the semiconductor element.

It is a fourth advantage of the invention that the "ridge-like" structure enables improved impedance matching, which is independent of the frequency over a large range.

Using a structure of this kind, parasitic elements can be eliminated. Moreover, the resonant structure constitutes the first element of a low-pass network, which simplifies the polarization circuit.

A microwave oscillator of this kind offers high efficiency as a result of the non-sinusoidal shape of the wave occurring in the semiconductor element when an avalanche-type semiconductor element is used, whilst the said microwave oscillator at the same time offers a wide tuning band.

The invention will be described in detail with reference to the accompanying diagrammatic drawings.

Figure 2:
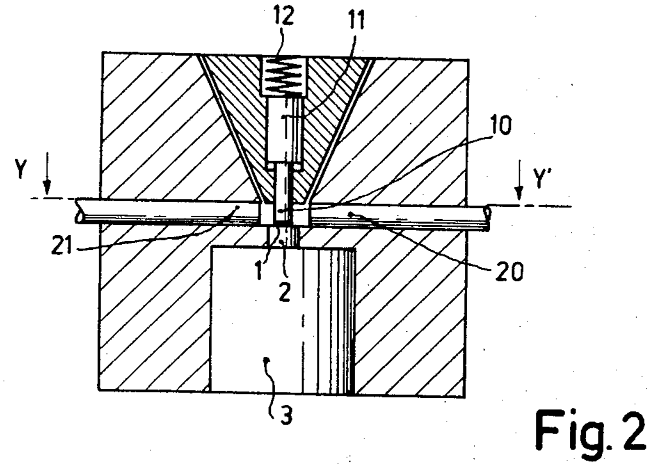
Figure 3:
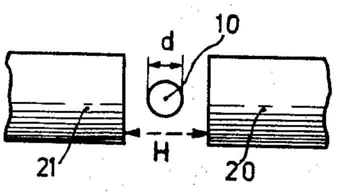
Figure 5:
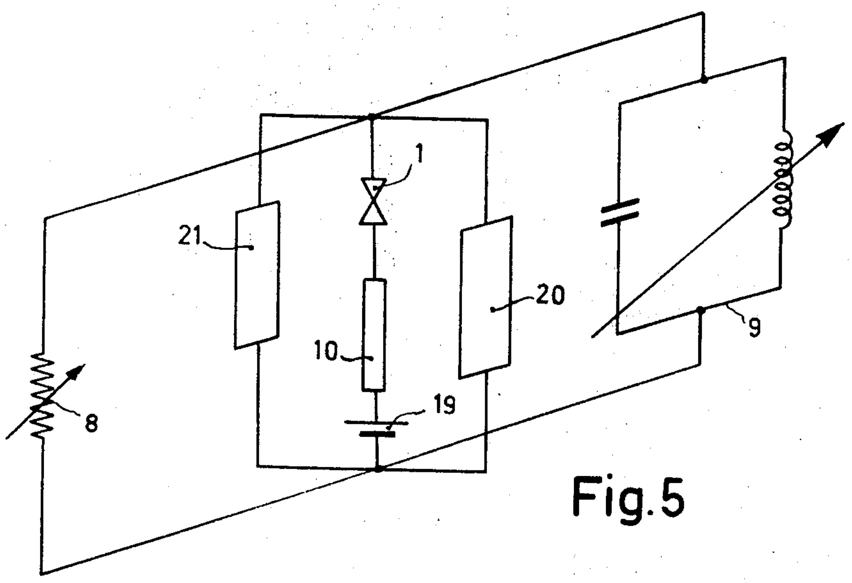
Figure 4:
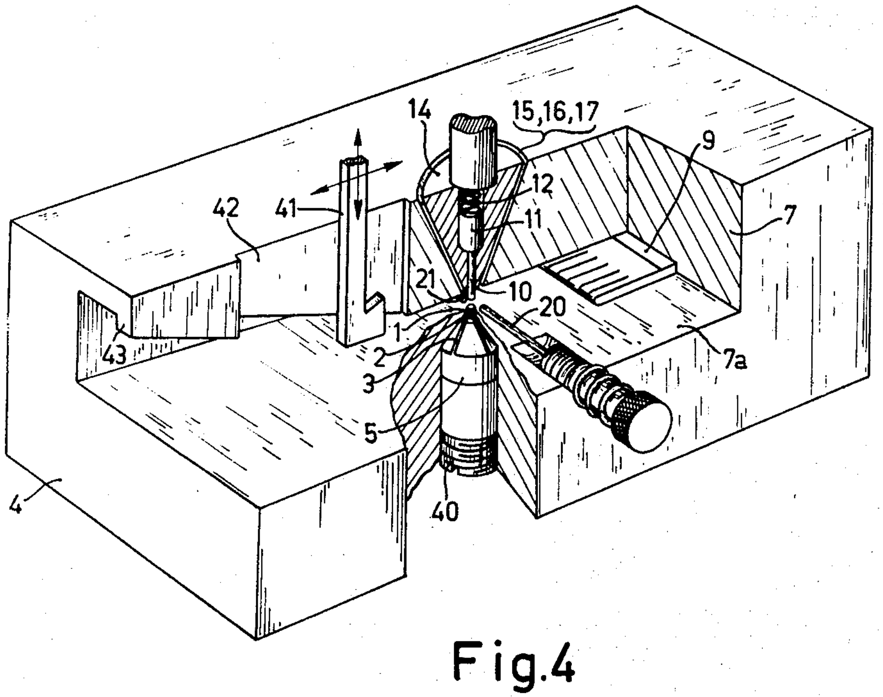

FIG. 1 is a longitudinal sectional view of the microwave oscillator according to the invention, FIG. 2 is a partial sectional view according to the plane XX' in FIG. 1, viewed from left to right by a person W, FIG. 3 is a partial plan view according to the plane YY' in FIG. 2, FIG. 4 is a perspective view of the microwave oscillator according to the invention, and FIG. 5 shows the equivalent circuit diagram.

FIG. 1 shows a semiconductor element 1 which is provided on the constricted portion 2 of a rod 3 which is made, for example, of gold-plated copper, the assembly formed by these two elements 2 and 3 being mounted according to commonly used techniques; the rod 3 is vertically located in a metal mass 4 by means of a clamp 5 and a very conventional clamping system 6 which will not be described herein.

The metal mass 4 constituted a ridge-type waveguide, a portion 7 of variable height of which has a horizontal lower surface 7*a* and an inclined upper surface 7*b*, the height of said waveguide increasing as from the semiconductor element until it becomes equal to the normal height of a rectangular waveguide. Another portion 8 of the waveguide has a very small height which is determined by the horizontal lower surface 7*a* and the horizontal upper surface 7*c*; this height is constant and is denoted by the letter $h$. The said waveguide portion 8 of very small height is closed by a short-circuit element 9. The upper surface of the part 2 of the rod 3 is situated in the same plane as the horizontal lower surface *7a* of the waveguide. The ridge-type waveguide thus performs the function, as if it were, of a transformer for impedance matching. Contact is established with the upper side of the semiconductor element 1 by means of a pin 10 of small diameter which is connected to a portion 11 which has a larger diameter but which constitutes an integral unit with the pin 10; this portion 11 provides the ridigity of the assembly; mounted on the portion 11 is a spring 12 which accommodates a supply voltage connection terminal 13. The upper end of the pin 10, extended by the portion 11 which is connected to the spring 12, is held in a conical member 14 which is insulated with respect to the waveguide.

The member 14 is made, for example, of brass. Provided between the inclined surface 15 of this member 14 on the one side and the surface 16 of the waveguide on the other side, is a dielectric 17 which is made, for example, of polytetrafluoroethylene, the assembly formed by the surfaces 15 and 16 and the dielectric 17 constituting an uncoupling capacitor for high frequencies. A capacitor of this kind facilitates the mechanical mounting and provides the insulation which is indispensable for proper operation. The member 14 can alternatively be made of anodized aluminium, in which case the dielectric can be dispensed with.

The pin 10 constitutes the central conductor of a T.E.M.-line, the outer conductors of which are formed by the end faces of two further pins 20 and 21 which are arranged to be displaceable with respect to the pin 10; the pin 20 is not visible in FIG. 1.

The d.c. power supply of the device is realized by means of a direct voltage source 19 which is connected between connection terminal 13 on the end of the spring 12 and an arbitrary connection 18 of the metal mass 4. The microwave power which is delivered by the described oscillator during operation is available on the side which is denoted by the arrow F.

FIG. 2 is a simplified sectional view which is turned through 90° with respect to FIG. 1 and which is taken according to the plane XX′ of FIG. 1, the section being viewed from left to right by a person W in FIG. 1. FIG. 2 again shows the semiconductor element 1 on the upper portion 2 of the rod 3, and also the central conductor 10 which forms part of T.E.M.-line and which is connected to the portion 11 and to the spring 12. The resonant structure of the T.E.M.-line is completed by the adjustable further pins 20, 21 on both sides of the central conductor 10. The two further pins 20 and 21 can be displaced by means of microscrews.

FIG. 3 is a plan view according to a plane YY′ of FIG. 2 which shows the central conductor 10 of the T.E.M.-line and the two further pins 20 and 21. The distance between said pins is denoted by the letter H, the diameter of the central sonductor being denoted by $d$.

FIG. 4 is an exploded perspective view of the device shown in FIG. 1. In FIG. 4 the semiconductor element 1 is shown at the area of the end of the portion 7 of the ridge, the said element being provided on the upper portion of the rod 3 of clamp 5; using a device 40, the movement of the clamp 5 which is directed from the lower to the upper side can be converted into a rotation which, by reaction of the metal mass on the clamp, firmly presses this clamp against the rod which is thus held in the correct position. The shortcircuit element 9 is shown on the lower surface *7a* of the waveguide.

The upper portion of the waveguide portion of small height is omitted in FIG. 4 so as to distinguish the constituent parts of the oscillator from each other. The short-circuit element 9 is formed, for example, by a resilient plate which is provided with slots to allow better contact.

Shown above the semiconductor element 1 is the central conductor 10 which forms part of the T.E.M.-line and which is extended by the portion 11 and the spring 12; the assembly thus formed is accommodated in the member 14 which is insulated with respect to the waveguide by the described uncoupling capacitor which is denoted in the figure by the numbers 15, 16 and 17. The already described resonant structure is formed by the further pins 20 and 21 and the central conductor 10. A matching element with plate 41 which is arranged according to the axis of the waveguide and which can be displaced according to two orthogonal directions is provided in a recess 42 in the wave guide. This element 41 is utilized to obtain a higher efficiency in that the position of the plate of this element directlt influence the impedance. The ridge of the ridge-type waveguide is denoted by 43.

FIG. 5 shows the equivalent circuit diagram of the oscillator. A first part of the circuit includes the semiconductor element 1 which is connected in series with the central conductor 10 of the T.E.M.-line and which is completed by the two further pins 20 and 21. FIG. 5 also shows the supply source 19. A second part of the circuit includes the load, the value of which is transformed by the waveguide portion of variable cross-section 7, the short-circuit element 9 also being included in this part.

The semiconductor element is thus connected in series with the short-circuited T.E.M.-line. If the developed heat is ignored, the oscillation frequency is determined by this line for a certain position of element 9. Further the short-circuit element 9 allows matching of the load.

The operation of the microwave oscillator is based on the fact that the portion in which the oscillation and resonant phenomena appear is the portion of the central conductor which is situated between the upper surface of the semiconductor element and the plane of the waveguide portion *7c* having the height $h$ (FIG. 1). As regards the high-frequency operation, this central conductor is completed by two adjustable further pins between which the distance H can be adjusted (FIG. 3).

If the semiconductor element is a diode which operates according to the relaxation mode, the height $h$ is selected such that $h = \lambda/12$, $\lambda$ being equal to $C/f$, $C$ being the propagation speed of light, and $f$ being the oscillation frequency. If the letter H is used to denote the distance at resonance between the two adjustable further pins which complete the T.E.M.-line, and $d$ is used to denote the diameter of the central conductor of said line, the relationship $H/d$ determines the characteristic impedance $Zc$ of the T.E.M.-line; if the resistance of the diode at low field strength is denoted by $Ro$, the condition $15 \leq Zc/Ro \leq 30$ is satisfied. The distance between the short-circuit element and the diode is approximately equal to λ/4 when the circuit is properly tuned.

It can be stated by way of example, that favourable results were obtained when the diode was provided on a rod, the upper portion of which had a diameter of 1.2 mm. When the upper surface of the rod was situated in the plane *7a* of the waveguide, the contact with the diode was established by a pin having a diameter of 200 microns and a length of 800 microns. A force of 10 grams was found to be optimum for establishing contact without damaging the diode. The diodes used were formed by a gallium arsenide crystal doped in accordance with the ratio of the height $h$ and the dielectric relaxation time of the semiconductor material; doping amounted to approximately $5.10^{15}$ $cm^{-3}$. Under these conditions and at a supply voltage of 11 volts, a power of 45 mW was obtained at an efficiency of 1.5 percent and an operating frequency of 33 GHz.

These numerical values are only given by way of example and in no way constitute a limitation of the possibilities of the microwave oscillator according to the invention.

An oscillator of this kind can be used for other semiconductor elements, for example, an avalanche diode, a tunnel diode etc., it then being necessary, of course, to adapt the operating conditions to the different elements. For example, in the case of an avalanche diode, the characteristic impedance of the line must be much smaller; this can be achieved by a reduction of the distance between the pins and the central conductor, the height $h$ amounting, for example, to λ/4.

Within the scope of the invention it is alternatively possible to adapt the device to lower frequencies, for example, the frequencies of the X-band.

What is claimed is:

1. A microwave device, comprising a rectangular waveguide which is provided with a ridge, half-way the transverse dimension, which extends in the longitudinal direction, perpendicular to the upper wall, which is galvanically connected thereto and which has good electrical conductivity, and a semiconductor element having a dynamic resistance which is negative for the microwave range, one side of the said element being galvanically connected to the lower wall of the waveguide, the other side being coupled to a connection terminal which is provided with a short-circuit which is active for microwave frequencies, the said short-circuit being connected between the connection terminal and the upper wall of the wave guide in order to enable the application of a direct voltage which polarizes the semiconductor element between the waveguide and the connection terminal, characterized in that it is provided with a structure which determines the resonant frequency and the impedance matching, the said structure comprising a very thin pin which is arranged between the connection terminal and the semiconductor element, perpendicular to the lower surface of the the waveguide, and also comprising two further pins which are situated in a plane which extends through the said thin pin, perpendicular to the longitudinal direction of the waveguide, the said two further pins being symmetrical with respect to the said thin pin and being arranged at right angles on the side walls of the waveguide.

2. A microwave device as claimed in claim 1, characterized in that the said two further pins can be adjusted in the axial direction.

3. A microwave device as claimed in claim 1, characterized in that the rectangular ridge-type waveguide is formed by a waveguide, a first longitudinal portion of which, situated on one side of the semiconductor element and comprising a short-circuit element whose position can be controlled, has a very small height, and a second longitudinal portion of which, situated on the other side of the semiconductor element, has a progressively increasing height.

4. A microwave device as claimed in claim 1, characterized in that the semiconductor element is a diode which functions according to the relaxation mode.

5. A microwave device as claimed in claim 4, characterized in that if $h$ denotes the height of the thin pin of the resonant structure and λ denotes the ratio of the propagation speed of light and the oscillation frequency, the height $h$ is chosen such that $h = \lambda/12$.

6. A microwave device as claimed in claim 4, characterized in that, if H denotes the distance at resonance between the end faces of the two adjustable pins and $d$ denotes the diameter of the thin pin, the ratio $H/d$ determines the characteristic impedance $Zc$ of a transmission line formed by the thin pin and the end faces of the said two further pins, and that, if $Ro$ denotes the resistance of the diode at low field strength, the requirement $15 \leq Zc/Ro \leq 30$ is satisfied.

7. A microwave device as claimed in claim 1, characterized in that the semiconductor device is an avalanche diode.

8. A microwave device as claimed in claim 1, characterized in that the semiconductor device is a tunnel diode.

* * * * *